Aug. 7, 1945.    C. R. GULBRANSEN    2,381,494
INDICATING INSTRUMENT
Filed Nov. 5, 1943    3 Sheets-Sheet 1
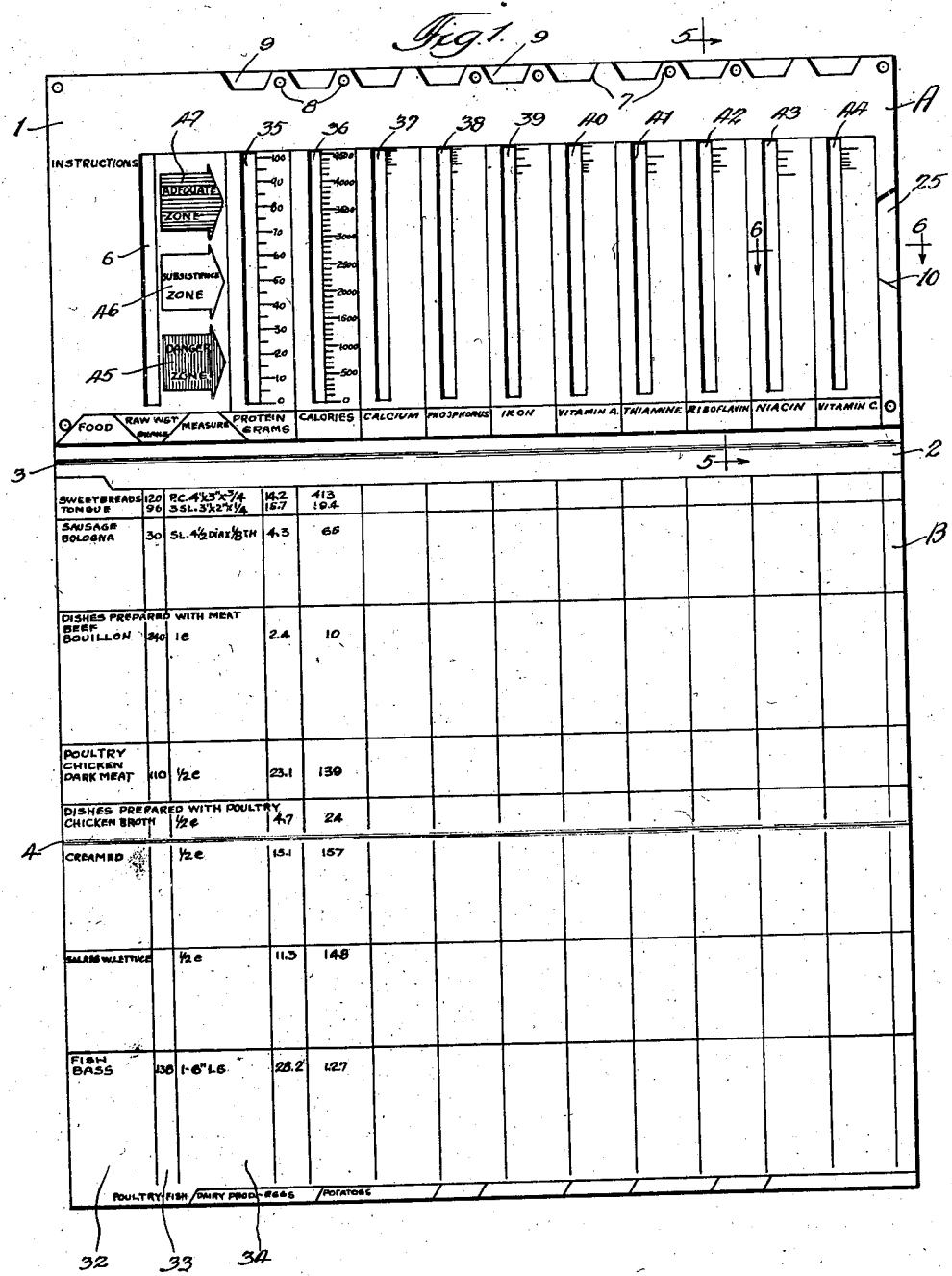
Inventor:
Capron R. Gulbransen
By: Thiess, Olsen & Mecklenburger
Attorneys.

Aug. 7, 1945.  C. R. GULBRANSEN  2,381,494
INDICATING INSTRUMENT
Filed Nov. 5, 1943  3 Sheets-Sheet 2
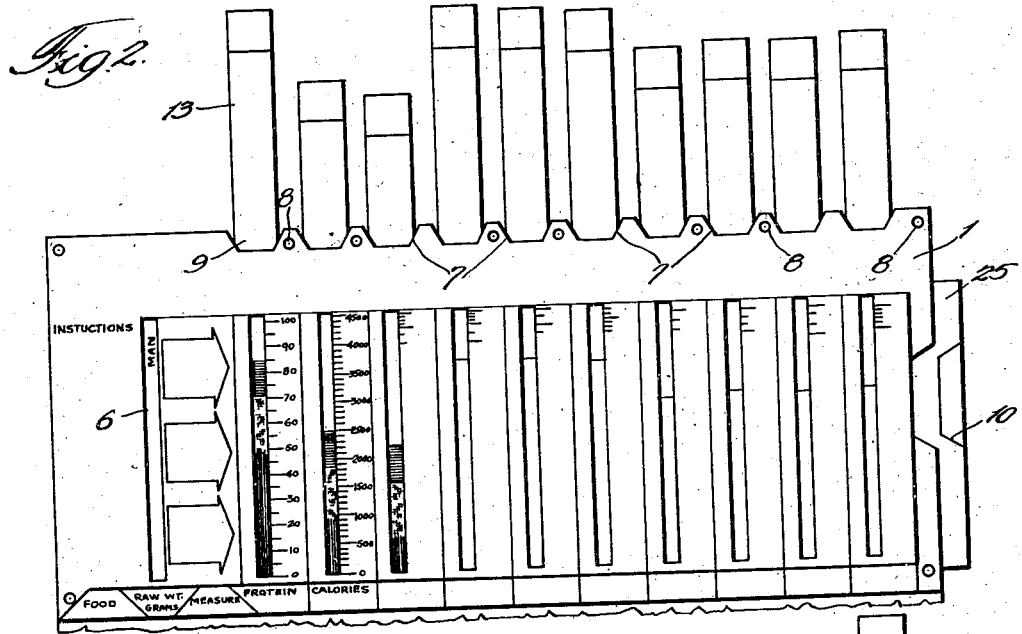
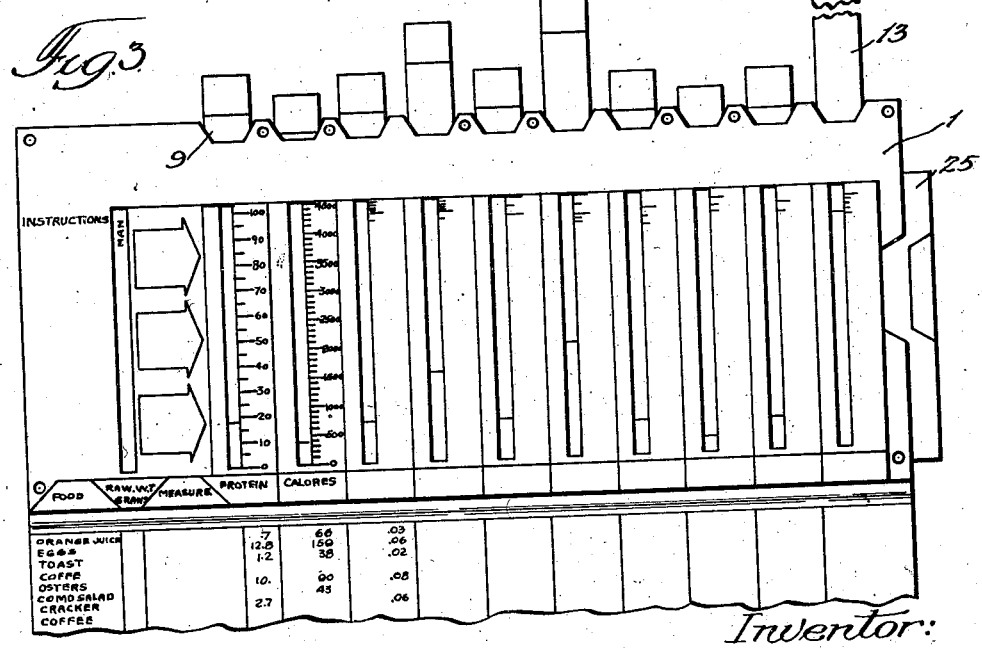
Inventor:
Capron R. Gulbransen
By: Thiess, Olsen & Mecklenburger
Attorneys.

Aug. 7, 1945.  C. R. GULBRANSEN  2,381,494
INDICATING INSTRUMENT
Filed Nov. 5, 1943    3 Sheets-Sheet 3
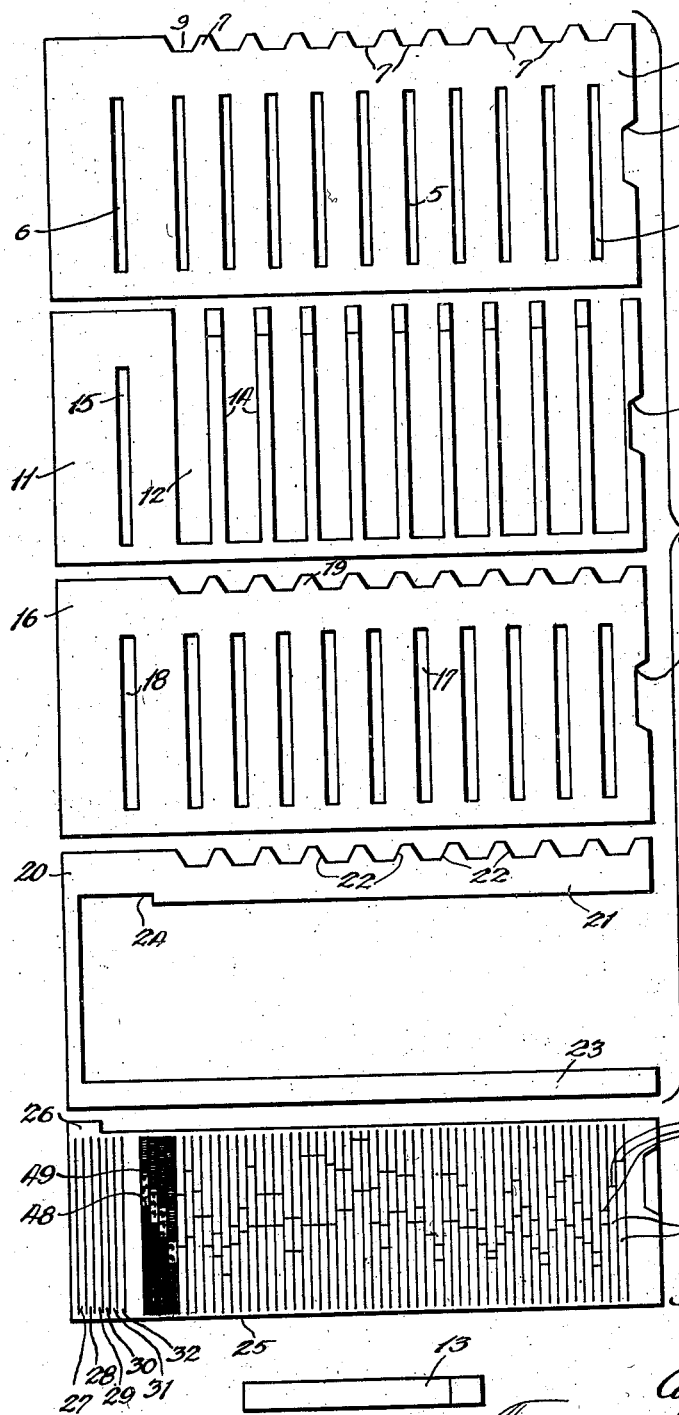
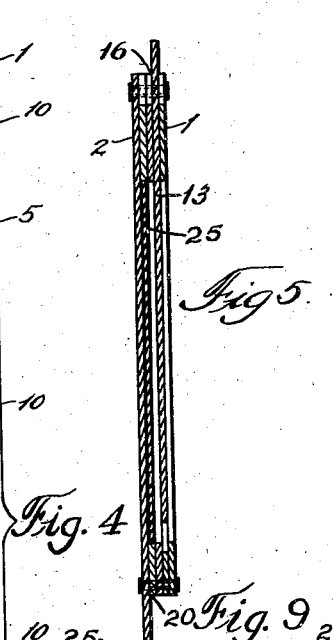
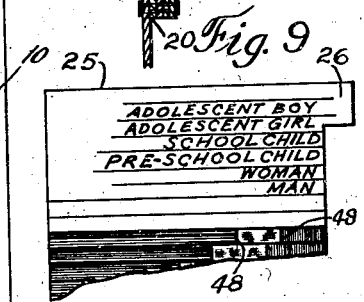
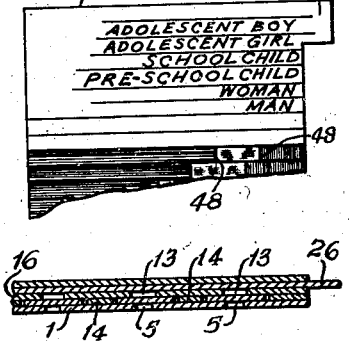
Inventor:
Capron R. Gulbransen
By: Thiess, Olson & Mecklenburger
Attorneys Patented Aug. 7, 1945

2,381,494

UNITED STATES PATENT OFFICE 2,381,494

INDICATING INSTRUMENT

Capron R. Gulbransen, Wilmette, Ill., assignor to National Live Stock and Meat Board, Chicago, Ill., a corporation of Illinois Application November 5, 1943, Serial No. 509,117

4 Claims. (Cl. 35—1)

The present invention relates to chart means and includes a device or structure having a compound scale at one part and a table or list of items as the other part, the two being connected together in permanent relation. The table constitutes a list of items or ingredients showing selected portions thereof and certain characteristics of the items based on the selected portions.

The main purpose and object of the present invention is to provide means whereby one may quickly determine the cumulative values of certain items appearing in the table portion of the device and in chosen quantities.

I have chosen to exemplify my invention as means for graphically presenting the nutritional value of foods consumed in any given period of time, e. g., a day, by a person typical of one of several selected classes so that the proper amount of important constituents of the food may be eaten to thereby maintain balanced diets for persons of the selected classes.

Another object of my invention is to provide a combined compound scale and table of items so arranged that selected values of said items may be visually set up on the compound scale and the cumulative amounts of said values, as so set up, becoming available for comparison with zones of predetermined maximum and minimum values for the said items.

A further object of my invention is to provide means for quickly determining the adequacy of diet for persons of different sex and varying ages, activities and conditions.

A still further object of the invention is to provide means for visually setting up the cumulative values of certain of the listed items for a fixed period of time to thereby enable a dietitian to adjust the diet of such a person so as to supply proper amounts of certain food constituents in that person's diet.

My invention has for an additional object the provision of means for graphically representing the dangerous, minimum, and adequate food values including certain selected constituents, for diets of persons to meet varying conditions of activity and in some cases differences in age.

Another object of my invention is to provide chart means having a shiftable member bearing contrasting portions and also bearing data designative of groups or classes of persons, the contrasting portions being arranged in sets with a set for every one of the several groups or classes.

Another object of my invention is to provide an indicating instrument which will enable the user to determine whether the consumption of certain amounts of certain foods in a certain time will supply quantities of certain food constituents in sufficient amounts to meet certain standards of sufficiency for certain types of persons.

Further objects and advantages of the invention will be apparent from the description and claims.

As herein exemplified, the invention is shown as set up to denote the minimum nutritional requirements and recommended nutritional allowances, of certain important food constituents, for six groups or classes of persons. These classes are (1) man, (2) woman, (3) pre-school child, (4) school child, (5) adolescent girl, and (6) adolescent boy. The nutritional requirements for the varying ages, activities, and conditions of the persons are shown for the several groups.

In order to make clear the visualization, three zones have been established, represented by areas of different colors on the chart and designated, respectively, "danger zone," "subsistence zone" and "adequate zone." These zones are arranged on the scale in the order named reading from the bottom up. On the slide member the lines separating the danger and subsistence zones or areas represent the minimum requirements for every food constituent designated on the compound scale. The lines separating the subsistence and adequate zones represent, for the major part, the recommended allowances as established by the Food and Nutritional Board of the National Research Council.

The table portion of the present invention consists of a list of foods with selected servings thereof and the nutritional values of every such serving, expressed in units of measurement of the food constituents as enumerated on the compound scale.

Another part of the invention comprises a compound scale having certain designations and indicia thereon and having certain movable members which may be easily manipulated to singly or cumulatively show, in connection with the indicia, the nutritional values of the food constituents eaten by a typical one of any of the six groups or classes of persons, one of the movable members carrying indicia of the maximum and minimum food requirements of the six groups or classes.

The danger zone or area is for the purpose of showing food values less than the minimum, a diet of which if continued will not prevent deficiency diseases. The subsistence zone or area represents food values between minimum requirements on the one hand and less than the recommended allowances on the other hand. A diet only within the subsistence zone will prevent actual illness but will not afford buoyant health.

The adequate zone represents food values essential to meet the recommended requirements.

The above, other and further objects of the invention will be apparent from the following description and accompanying drawings.

The accompanying drawings illustrate one form of my invention as applied to a device for showing the nutritional values of foods eaten, and the views thereof are as follows:

Figure 1 is a front face view of the device open for use and showing at the upper part the compound scale and its indicia and in the lower part exemplifications of the table showing certain food items, the amounts of selected servings of these items, with the weight of the servings in grams, and the nutritional values of the selected servings for the constituents named on the compound scale, such as protein, calcium, phosphorous, iron, and certain of the vitamins;

Fig. 2 is an enlarged face view of the compound scale with the slot slides extended to show the cumulative values of the food constituents constituting a recommended diet for a moderately active man;

Fig. 3 is a similar view showing the slot slides adjusted to show the cumulative value of the named food constituents as appear on the portion of the table shown below the compound scale so that a dietitian by inspecting such compound scale could readily ascertain the food constituents required for the next meal to bring the value for the day up to the recommended amount;

Fig. 4 is an exploded view of certain of the parts used in making up the scale;

Fig. 5 is a cross-sectional view taken in the plane of line 5—5 of Fig. 1;

Fig. 6 is a fragmentary sectional view taken in the plane of line 6—6 of Fig. 1;

Fig. 7 is a plan view of one of the vertical slides;

Fig. 8 is a view of the horizontal slide member of the scale showing the six classes of persons along one end and showing the arrangement of the color areas on the slide member together with certain indicia in some of the columns; and Fig. 9 is an enlarged view of part of the construction shown in Fig. 8.

The device includes the compound scale or indicating instrument A and the table or list B.

The compound scale as illustrated includes a front member 1 and a back member 2 (Fig. 5), preferably of heavy paper or cardboard material. The back member extends below the compound scale, when the device is open, to constitute a support for the table.

The device as illustrated is arranged in three panels with fold lines at 3 and 4 to fold into a substantially flat shape convenient to place in a pocket.

The front member 1 is provided with a plurality of parallel slots 5 (Fig. 4) laterally spaced one from another and arranged with their lengths transversely of the length of the front member. An endmost slot 6 is provided, parallel to the other slots for a purpose to be later described. The upper margin of the front member 1 as well as the back member 2 is serrated as at 7 to provide portions for securing rivets 8 as well as spaces 9 therebetween to expose the ends of the vertical slot slides for prehension. The right-hand ends of the front and back members are notched as at 10 to provide a space to grasp the horizontal slide member of the compound scale.

Next behind the front member 1 is a guide member 11 (Fig. 4) provided with slots 12, open at their upper ends, which lie behind the slots 5 of the front member and serve as guides 14 for the vertical slot slides 13. There is a slot 15 adapted to register with the slot 6 in the front member. A third member 16 lies behind the second member 11 and is provided with slots 17 to register with the slots 5 in the front member, and a slot 18 to register with the slot 6 in the front member. The upper margin of this member is provided with serrations 19 to correspond with those on the upper margin of the front member.

A fourth member 20 is disposed behind the member 16. This member has an upper portion 21 having similar serrations 22 along its upper margin, and a lower longitudinal portion 23. The major portion of this member is cut out and is fashioned with a notch 24 adjacent the upper left-hand corner.

The horizontal slide member 25 is shaped to fit within the cut out portion of the member 20 and is provided with a lug 26 to lie within the slot 24. The lug 26 is in length less than the length of the notch, so that the slide 25 may have sliding movement, which movement is limited by engagement of the lug 26 with the ends of the notch 24.

At the left-hand end of the slide member 25 and crosswise of the member appear indicia as to the six classes of persons heretofore named, and arranged thereon in the following order from left to right, "adolescent boy," "adolescent girl," "school child," "pre-school child," "woman" and "man," and identified in Fig. 8 by reference characters 27, 28, 29, 30, 31 and 32, in the order named.

In the space 27 is additional data identified by the numeral 14 (not shown) which applies to boys 13 to 15 years of age. The numeral 18 thereon applies to boys 16 to 20 years of age.

In the space 28 is a numeral 18 (not shown) applying to girls 13 to 15 years of age and a numeral 18 applying to girls 16 to 20 years of age. In the third space 29 is a numeral 8 (not shown) applying to a child 7 to 9 years of age and a numeral 11 applying to a child 10 to 12 years of age. In the fourth space 30 is a numeral 2 applying to a child 1 to 3 years of age and a numeral 5 applying to a child 4 to 6 years of age. In the fifth space 31 is a letter "V" (not shown) meaning very active, a letter "M" meaning moderately active, a letter "S" meaning sedentary, a letter "L" for "during lactation" and a letter "P" for "during pregnancy."

In the last space 31 is a letter "V" for very active, a letter "M" for moderately active, and a letter "S" for sedentary.

Along the length of the slide member 25 are columns of colored zones, the lowermost zones being red, the intermediate zones being yellow and the upper zones being blue.

In some of these columns appear the numerals and letters (not shown) appearing in the various six designations of classes of persons, the presence of such numerals or letters indicating the maximum recommended food allowance in the adequacy zone.

The back member 2, as heretofore explained, extends below the compound scale, when the device is open, to constitute a backing for the table or list B.

Referring to Figure 1, certain portions of one of the pages of the list show a columnar arrangement with the foods listed in the first column, the weight in grams of such foods in the second column, the amount of foods or selected portions in the third column, which portions weigh the amounts appearing in the gram column 33. The food column is 32 and the selected portion column is 34.

The slots in the front member 1 are labeled, beginning at the left, as follows: Slot 35 is for proteins, slot 36 for calories, slot 37 for calcium, slot 38 for phosphorous, slot 39 for iron, slot 40 vitamin A, slot 41 thiamine, slot 42 riboflavin. This ingredient contains vitamin B2. Slot 43 is labeled for niacin and slot 44 for vitamin C.

Along the margins of the several slots appear indicia, the indicia for all of the slots except number 36, the calorie slot, representing grams. The calorie slot 36 represents calories.

Between the slots 6 and the slot 35 are zones or areas reading from the bottom up as follows: 45 danger zone, 46 subsistence zone and 47 adequate zone. These zones are colored, respectively, red, yellow and blue, in the order named, to correspond with the color arrangement on the slide member 25.

The several columns on the slide member 25 are colored as heretofore mentioned and vary in vertical height (Fig. 8), the variations applying to the three zones mentioned and graphically showing the comparative extent of the various food constituents mentioned in the three zones. These heights have a definite relation to the vertical scales on the front member 1.

The lines 48 separating the blue from the yellow zones, that is, the danger zone from the subsistence zone, represent the minimum requirement for every one of the food constituents designated on the compound scale. The lines 49 separating the yellow zones from the blue zones represent, for the major part, the recommended allowances of the various constituents as established by the Food and Nutritional Board and the National Research Council and based on the values of these constituents as the same appear in the table and arranged in columns underneath the designated slots in the front member.

Fig. 2 shows the compound scale set up to show recommended diet for a moderately active man. In this figure the slide member 25 has been pulled to the right to bring the word "Man" into register with the slot 6. Such movement of the slide member brings the corresponding colored columns on the slide member into register with the various slots so that the lines of demarcation and the difference in color of the zones on the backgound visible through the slots will be readily apparent. The slides 13 have been raised so that the lower margins thereof cumulatively show the total food values of the several constituents additively, as the constituents of the several foods eaten are added up and the slot slides extended accordingly. It will thus be observed that a dietitian having manipulated the slot slides as exemplified in Fig. 2, will have before her a visual exposition of the food values eaten by the particular person for a day. Should the cumulative values of the several constituents appear in the subsistence zone, then any shortage of any such constituent should be made up at the next meal. Should the positions of the slot slides 13 indicate that too much of one and not enough of another constituent has been eaten, an allowance for such fact may be made at the next meal and the diet balanced accordingly.

Fig. 3 shows the compound scale set up to cumulatively illustrate the food values, of the foods enumerated immediately below the compound scale, in accordance with the figures there appearing. The food appearing on this portion of the table has been listed at random to show what a person may have had for breakfast and for lunch. The difference in food values between what is shown by the positions of the slot slides 13 with reference to the colored zones on the slide member 25 may be utilized in planning the third meal for the day so that food furnishing the difference between what is shown by the lower ends of the several slot slides and that indicated by the colored zones on the slide member may be made up at the evening meal.

It will be observed, in referring to Fig. 3, that the food values for the two meals are in the main short of the adequate zone so that to maintain a balanced diet the deficiency must be made up at the next meal.

Comparing the set-up shown in Figs. 2 and 3, it will be observed that if the set-up of Fig. 3 represents the breakfast and lunch of a moderately active man the difference in settings of the slot slides 13 in Fig. 3 and the settings of the slides in Fig. 2 becomes readily apparent. It is thus easy to ascertain what foods, and in what quantities, should be eaten for the third meal in order to equal the diet as set up in Fig. 2.

It will be observed that my invention makes it possible for a dietitian to readily manipulate the slot slides 13, to additively show the foods eaten by any typical person of any one of the six classes mentioned.

The slide member 25 is moved endwise until the division, 27 to 32, inclusive, designative of the class, becomes visible through the slot 6. Such movement of the slide brings the proper zone exposition for that person into register with the slots 5, and manipulation of the slot slides 13 may then be made to visually set up the food eaten.

It is believed that the brief explanation just given will make it readily apparent to a dietitian that the numerals and letters in the various columns of the slide member 25 will by reference to the numerals and letters in the spaces 27 to 32, inclusive, connect one with another.

Further modifications will be apparent to those skilled in the art and it is desired, therefore, that the invention be limited only by the scope of the appended claims.

Having thus described my invention, what I claim and desire to secure by Letters Patent is:

1. In a device of the class described, a compound scale for use in totaling the food constituent values of food items, said compound scale including front and back members secured together along opposite edges, the front member having a plurality of laterally spaced parallel respectively different slots, a slide member between the front and back members movable in a direction at right angles to the length of the slots and being provided with a plurality of colored areas adapted to register with the slots to designate predetermined maximum and minimum limits of food items and also provided with indicia designative of different conditions of use of the items, the colored areas being differently positioned upon the slide with respect to indicia constituting the designation of a particular set of conditions, whereby to vary the amounts indicated, the indication of said amounts being given by the lengthwise position of the slide with respect to the slots, slides between said front member and said slide member movable lengthwise of the slots to cover and expose portions of the colored areas of the said slide member in register with said slots, and scales with respect to which said slides are movable to total the various constituents of the various items.

2. Means for visually setting up food values consumed by one of a selected group of persons for a fixed period of time such as a day comprising in combination, a member having a plurality of parallel laterally spaced slots, numerical indicia along said slots and slides movable along said slots to denote the total amounts of the several constituents present in the food eaten, a slide member behind said slots and movable in a direction at right angles to the length of the slots, said first member having a notch parallel to, and laterally disposed from, the endmost slot at one end of said first-mentioned slots, the said slots being labeled to indicate the food constituents, said slide member bearing indicia visible through said last-mentioned slot when said slide member is moved to show the sufficiency of nutritional value of the foods eaten by said person and also bearing differently colored zones as background for said slots, with the extent of the zones lengthwise of the slots differing in the several slots, said first member having similarly colored zones to designate respectively from bottom to top of the slot lengths, danger zone, subsistence zone and adequate zone, the colored zones on said slide member being arranged in the same order as the zones on said first member, slides behind said slots movable lengthwise of the slots to expose the slot backgrounds as said slides are moved to expose only as much of the backgrounds as correspond to the values of said food constituents, said slides being adapted to be progressively moved as the constituent values of the several food items eaten are set up, to designate the value of said constituents by uncovering the backgrounds, whereby the exposed colored zones on the backgrounds will be visible to indicate by extent of zones uncovered the sufficiency of the constituents of the consumed foods and enable comparison thereof to be made with the zones on the first member to enable the observer to determine what increase or decrease of constituents should be made in the daily diet.

3. A device for illustrating cumulative nutritional values of food consumed in any given period by a person classifiable in one of several selected classes, comprising a member having a plurality of parallel slots, a member slidable behind said slots in directions at right angles to the length of said slots, individual slides behind said slots respectively and in front of said slidable member movable in the direction of the length of the slots, said first member bearing separate graphically arranged areas, differently-colored respectively, adapted to be visible through said slots, said first member bearing distinguishably-colored zoned indicia adapted to represent different degrees of adequacy of the nutritional values of foods consumed by said one classifiable person.

4. An indicating instrument which will enable the user to determine whether the consumption of certain amounts of certain foods in a certain time will supply quantities of certain food constituents in sufficient amounts to meet certain standards of sufficiency for certain types of persons comprising a plurality of manually adjustable numerically progressive scale and index indicators, one for each food constituent, for showing on the numerical scale the sum of the quantities of this constituent found in the several different foods, and a unitary manually adjustable sufficiency indicator movable to a number of different positions, one for each of said several types of persons, said sufficiency indicator having a plurality of sufficiency indicating portions, one for each food constituent indicator, brought into juxtaposition with respect to said index as the index is moved, to indicate sufficiency, each sufficiency indicating portion having a plurality of sufficiency indicating divisions, one for each type of person indicated, each division indicating the amount of a food constituent sufficient for one type of person, groups of type divisions, one from each of said portions, being successively brought into juxtaposition with respect to the food constituent sum indexes, respectively, whereby for each of the various group positions there are indicated the various amounts of the various food constituents sufficient for a person of one group.

CAPRON R. GULBRANSEN.